United States Patent
Lee

(10) Patent No.: US 7,677,487 B2
(45) Date of Patent: Mar. 16, 2010

(54) FLY REEL

(75) Inventor: Jae Koo Lee, Kimpo (KR)

(73) Assignee: Juho Corporation, Kimpo, Kyungki-Do (KR)

( * ) Notice: Subject to any disclaimer, the term of this patent is extended or adjusted under 35 U.S.C. 154(b) by 163 days.

(21) Appl. No.: 11/913,666

(22) PCT Filed: Jul. 26, 2005

(86) PCT No.: PCT/KR2005/002417

§ 371 (c)(1),
(2), (4) Date: Nov. 5, 2007

(87) PCT Pub. No.: WO2006/121231

PCT Pub. Date: Nov. 16, 2006

(65) Prior Publication Data

US 2009/0179101 A1   Jul. 16, 2009

(30) Foreign Application Priority Data

May 9, 2005   (KR) .................. 10-2005-0038512

(51) Int. Cl.
*A01K 89/01* (2006.01)
(52) U.S. Cl. .................. 242/317; 242/246; 242/295
(58) Field of Classification Search .................. 242/317, 242/245, 295, 246
See application file for complete search history.

(56) References Cited

U.S. PATENT DOCUMENTS

| | | | | |
|---|---|---|---|---|
| 4,657,201 A | * | 4/1987 | Munroe | 242/265 |
| 5,556,049 A | * | 9/1996 | Bennett et al. | 242/295 |
| 5,615,840 A | * | 4/1997 | Bushnell et al. | 242/301 |
| 6,053,445 A | * | 4/2000 | Farris | 242/303 |
| 6,209,815 B1 | | 4/2001 | Collier | |
| 6,267,312 B1 | * | 7/2001 | Farris et al. | 242/295 |
| 6,286,772 B1 | * | 9/2001 | Koelewyn | 242/246 |
| 6,513,743 B1 | * | 2/2003 | Perkins et al. | 242/295 |
| 7,168,647 B1 | * | 1/2007 | Kang | 242/303 |
| 7,431,232 B1 | * | 10/2008 | Kang | 242/303 |
| 2005/0103912 A1 | | 5/2005 | Koelewyn | |

FOREIGN PATENT DOCUMENTS

JP   2004-135542   5/2004

* cited by examiner

*Primary Examiner*—Emmanuel M Marcelo
(74) *Attorney, Agent, or Firm*—IPLA P.A.; James E. Bame

(57) ABSTRACT

The present invention relates to a fly reel, wherein the drag system installed in frame comprises: a drag knob that is connected rotation-controllably to one side periphery of center shaft; a drag spindle that is connected rotationally to periphery of said center shaft and distantly from said drag knob; a friction means for restraining controllably any one-directional rotation force of said drag spindle in accordance with transferred amount of said drag knob moved to axial direction of said center shaft; a drag spindle insert that is inserted rotationally to periphery of said center shaft and rotated by rotational manipulation of said spool; and a unidirectional bearing that is inserted at inside of said drag spindle for permitting one directional rotation and restraining the other directional rotation of said drag spindle insert being inserted therein. Overall configuration thereby can be made efficient and simple; direction setting of unidirectional bearing can be changed easily if necessary.

5 Claims, 4 Drawing Sheets

FLY REEL

TECHNICAL FIELD

The present invention relates generally to a fly reel, more particularly to a fly reel wherein spool can be easily attached to or detached from frame and the configuration of drag system to control rotational speed of spool was made so simple that overall productivity can be improved.

BACKGROUND ART

A fly reel comprises in general: a spool to wind or unwind fishing line, a frame to support said spool rotationally, and a drag system to regulate rotational speed of said spool. By rotation of the knob attached to a side of spool, fishing line can be wound rapidly on spool; or otherwise reversely unwinding speed of fishing line out of spool can be increased or decreased by said drag system.

Such fly reels described as above have been developed in various kinds so far. Proposed fly reels until today have been concentrated only on fractional improvement of total function, which are, for example, connection structure of spool and frame, drag system to regulate rotational speed of spool, structure on functional conversion wherein drag-working direction of spool rotation should be converted for left-handed people, generation of spool rotational noise or drag noise and cutoff system thereof, and so on. In these traditional arts, however, all of said devices could not be arranged effectively and efficiently having intra relations within a narrow space formed in either frame or spool, and therefore their configurations were made very complicated and productivity was lowered accordingly, which have raised related problems and drawbacks.

Other further problems and drawbacks would be involved in case where unidirectional bearing or ratchet gear was built-in within spool or frame for conversion of drag-set direction. When a user needs to convert the set direction of said unidirectional bearing or ratchet gear, drag system first should be broken down, the bearing or ratchet gear is turned over then inserted again into system. Since breakdown and assembling process is difficult to handle, it is not easy to convert the direction of drag. Moreover, it is highly probable that wetness would penetrate into inner mechanical structure during conversion process of set direction, so shaft supporting part will be rusted later. It is very often that such parts like washer or snap ring would pop out by elasticity to be lost or broken in replacing process, and therefore the user would not be able to use the reel set on fishing anymore.

DISCLOSURE OF THE INVENTION

Technical Problem

The present invention was contrived to alleviate or solve the problems and drawbacks mentioned as above. Accordingly, it is an objective of the present invention to provide a fly reel wherein the spool can be attached to or detached from the frame conveniently, and the drag system for speed controlling of spool rotation has simpler configuration and higher accuracy of drag controlling so as to enhance the productivity and reduce production cost.

Another objective of the present invention is to provide a fly reel wherein set direction of built-in unidirectional bearing in the drag system can be converted easily without worrying about other parts to be lost.

Technical Solution

In order to achieve the objectives described as above, the fly reel according to present invention comprises a frame that is equipped with a hub at center, a center shaft that is fixed-connected to said hub of frame, a spool that is connected rotationally to said center shaft for winding or unwinding the fishing line, and a drag system that is connected to said center shaft for controlling the rotational speed of said spool, wherein said drag system comprises: a drag knob that is connected rotation-controllably to one side periphery of said center shaft; a drag spindle that is connected rotationally to periphery of said center shaft and distantly from said drag knob; a friction means for restraining controllably any one-directional rotation force of said drag spindle in accordance with transferred amount of said drag knob moved to axial direction of said center shaft; a drag spindle insert that is inserted rotationally to periphery of said center shaft and rotated by rotational manipulation of said spool; and a unidirectional bearing that is inserted at inside of said drag spindle for permitting one directional rotation and restraining the other directional rotation of said drag spindle insert being inserted therein.

Said drag spindle insert is preferably prevented from moving of axial direction of said center shaft due to a sleeve that is inserted at periphery of said center shaft.

It is preferable in said drag spindle that no. 1 extension part and no. 2 extension part are formed protrusively as respective axial directional extensions with a border of a flange formed at the center; in said no. 1 extension part, bearing is inserted therein, and rectangular part is formed at its periphery; and in said no. 2 extension part, one or more key grooves are formed extendedly to axial direction.

Said drag spindle insert preferably consists of a flange where a pin groove is formed for insertion of protrusion pin of the spool, and an outer extension part that is formed extendedly to axial direction from said flange for insertion of unidirectional bearing.

Said friction means preferably comprises a fixed plate that is inserted at periphery of said drag spindle and movably to axial direction of said drag spindle so as not to be rotated together with said drag spindle when said drag spindle rotates; a rotational plate that is inserted at periphery of said drag spindle and movably to axial direction of said drag spindle so as to be rotated together with said drag spindle when said drag spindle rotates; and a wave spring that is inserted at periphery of said drag spindle and adjacent to said rotational plate and movably to axial direction for providing a certain amount of elastic force against the pressure applied on said drag spindle.

ADVANTAGEOUS EFFECT

According to the fly reel of the present invention, the spool can be attached to or detached from the frame conveniently, and the drag system for speed controlling of spool rotation has simpler configuration and higher accuracy of drag controlling so as to enhance the productivity and reduce production cost. Furthermore, according to the fly reel of the present invention, set direction of built-in unidirectional bearing in the drag system can be converted easily without worrying about other parts to be lost.

BEST MODE FOR CARRYING OUT THE INVENTION

Hereinafter, the fly reel according to preferable embodiments of the present invention will be described with reference to appended drawings.

Figure 1:
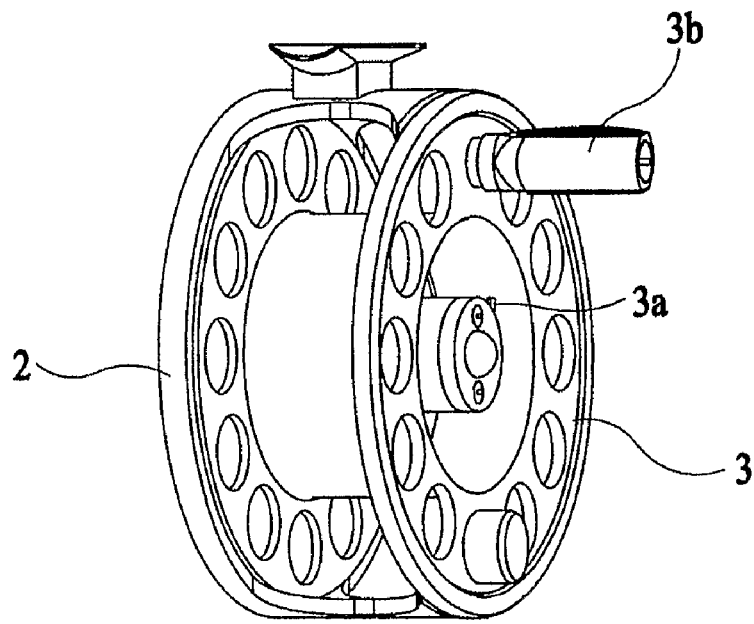
FIG. 1 is an external isometric view illustrating a fly reel according to the present invention.
Figure 2:
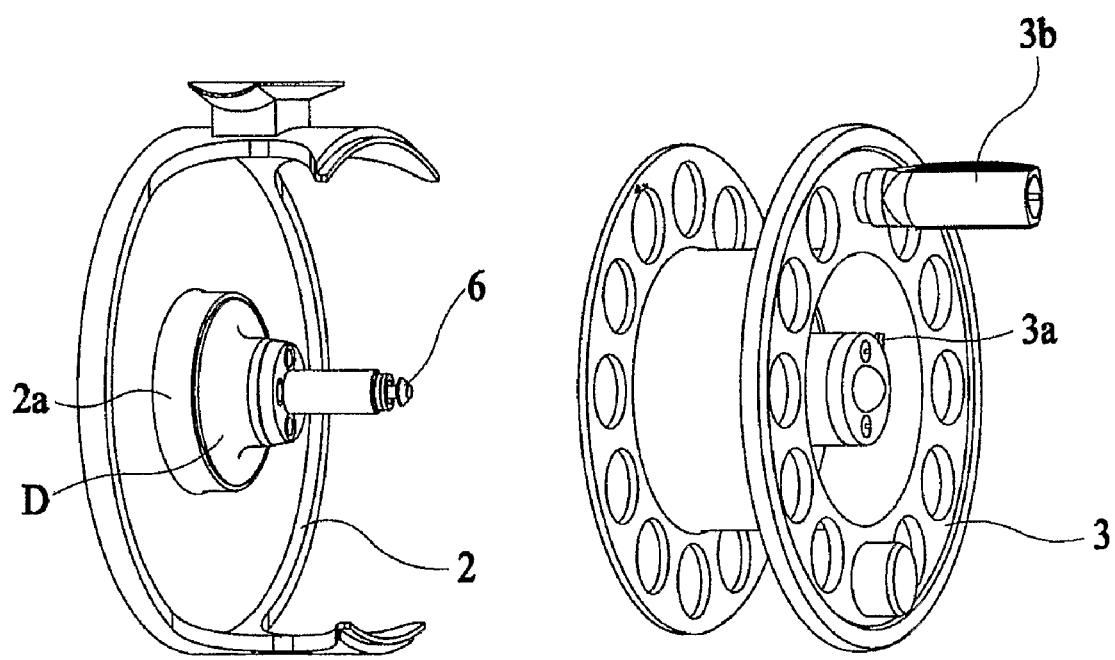
FIG. 2 is an exploded isometric view illustrating the state where a fly reel according to the present invention was separated into spool and frame.

Referring to FIGS. 1 and 2, the fly reel according to the present invention comprises a frame 2 that is equipped with a hub 2a at center, a center shaft 6 that is fixed-connected at said hub 2a of frame 2, a spool 3 that is connected rotationally to said center shaft 6 for winding or unwinding the fishing line, and a drag system D that is connected to said center shaft 6 for controlling the rotational speed of said spool 3.

Figure 3:
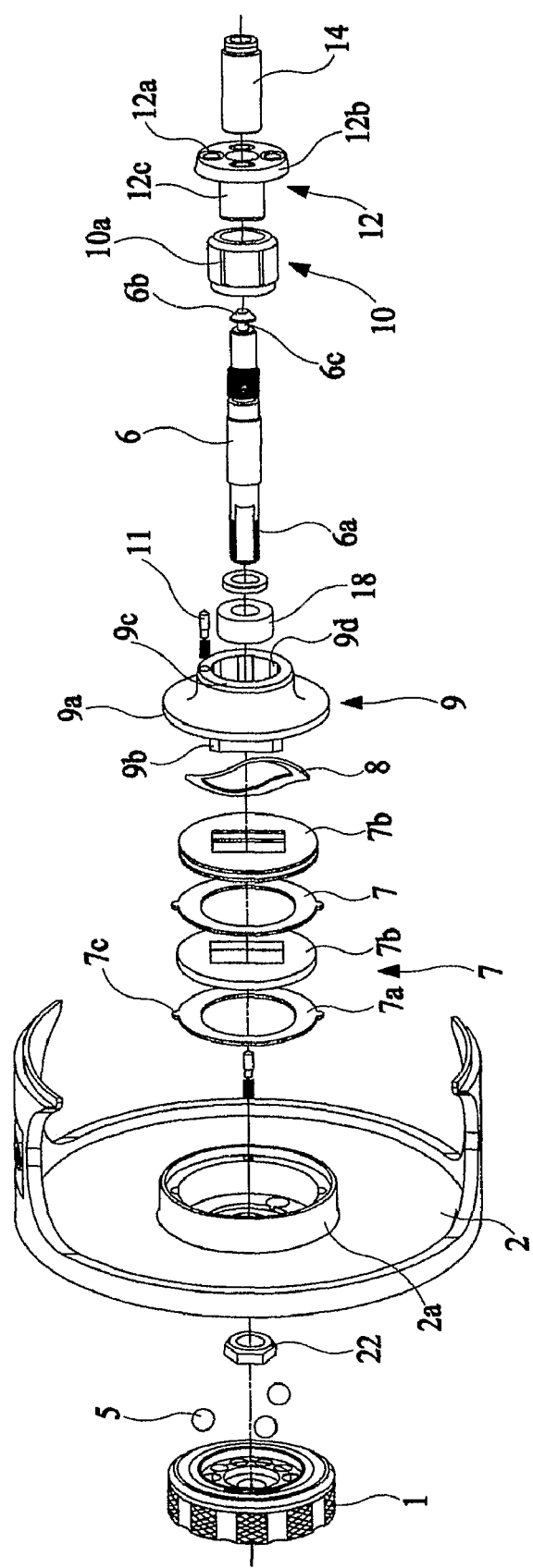
FIG. 3 is an exploded isometric view illustrating frame and drag system of a fly reel according to the present invention.
Figure 4:
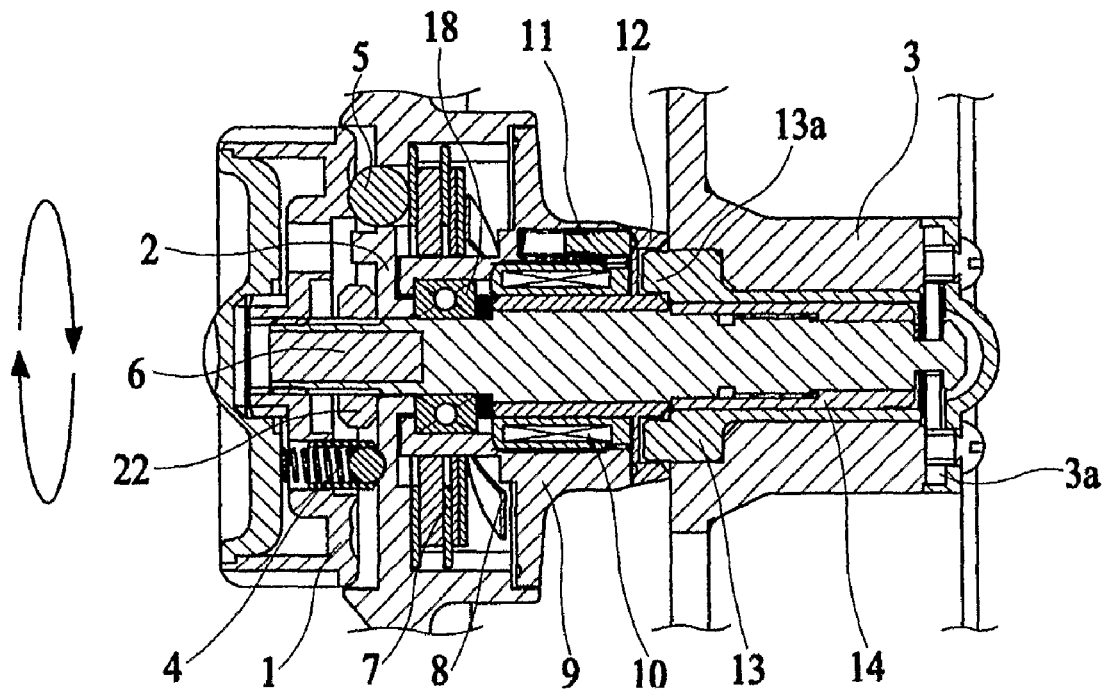
FIG. 4 is a cross sectional view illustrating the state before drag works in a fly reel according to present invention.
Figure 5:
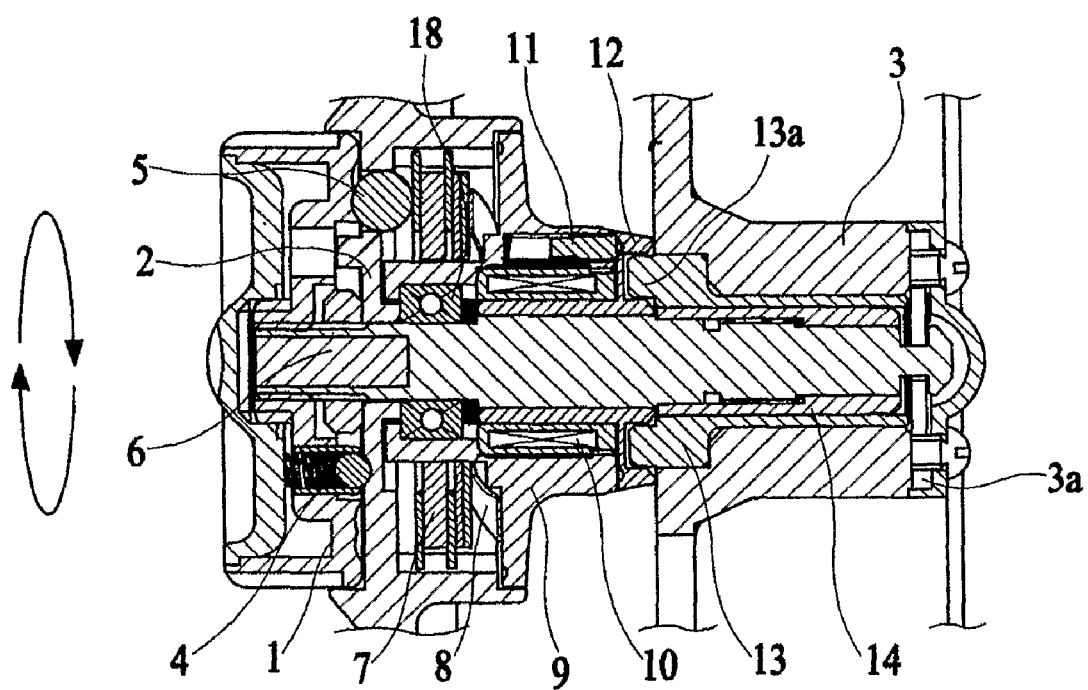
FIG. 5 is a cross sectional view illustrating the state after drag works in a fly reel according to present invention.

Referring to FIGS. 3 to 5, said center shaft 6 is fixed-connected to the center hub 2a of said frame 2 by a nut 22 that is screw-connected to the screw part 6a that is formed on periphery at one side; and at the other side portion of said center shaft 6, a head part 6b and a neck part are formed to make a lockup groove 6c. Into this lockup groove 6c, an attaching/detaching lever 3a of spool 3 that will be described hereinafter is inserted so that said spool 3 can be connected rotationally on center shaft 6.

In said spool 3 referring to FIG. 4, a shaft hole is formed at the center; and into this shaft hole, a spool bushing 13, wherein a protrusion pin 13a for rotating the drag spindle insert 12 that will be described hereinafter is formed, is forcibly inserted. At one side, as illustrated in FIG. 1, there is a knob 3b formed for winding or unwinding the fishing line. In case where the spool 3 is to be departed from or assembled to the frame, it can be easily done so by use of attaching/detaching lever 3a formed at one side of spool 3.

Said drag system D is a part that is connected to the center shaft 6 for controlling or restraining the rotational speed of said spool 3, and comprises, as illustrated in FIGS. 3 to 5, a drag knob 1, a drag spindle 9, a friction means 7, a drag spindle insert 12, and a unidirectional bearing 10.

Said drag knob 1 is screw-connected rotation-controllably to screw part 6a that is formed on periphery at one side of center shaft 6. The rotation of said drag knob 1 enables push balls 5 that were installed adjacent to it as insertion into the holes formed at one side of the frame 2 to move to axial direction of center shaft 6. Undescribed number 4 is a ball plunger spring.

Said drag spindle 9 is connected rotationally to periphery of said center shaft 6 and distantly from drag knob 1 within hub 2a that was formed at center of the frame 2; and no. 1 extension part 9b and no. 2 extension part 9c are formed protrusively as respective axial directional extensions with a border of a flange 9a that was formed at the center. In said no. 1 extension part 9b, bearing 18 is inserted therein, and a rectangular part having a rectangular cross section is formed at its periphery so that a friction means 7 to be described hereinafter can be installed. In said no. 2 extension part 9c, a number of key grooves 9d are formed extendedly to axial direction therein so that unidirectional bearing 10 to be described hereinafter is permitted to move to axial direction of center shaft 6 and prevented from rotation of circumferential direction. Undescribed number 11 is a clicker.

Said friction means 7 is a part for restraining controllably any one-directional rotation force of said drag spindle 9 in accordance with transferred amount of drag knob 1 moved to axial direction of said center shaft 6, and comprises, as illustrated in FIGS. 3 to 5, a fixed plate 7a, a rotational plate 7b, and a wave spring 8.

Said fixed plate 7a has at its center a hole formed with a bigger diameter than maximum outer diameter of said no. 1 extension part 9b so that moving from periphery of no. 1 extension part 9b of drag spindle 9 to axial direction of said drag spindle 9 is possible; and, at its periphery, protrusion part 7c is formed each up and down respectively being inserted into the groove that is formed at inside of hub 2a of the frame 2. Because of said protrusion part 7c being inserted into said groove, fixed plate 7a does not rotate together with said drag spindle 9 even in case drag spindle 9 is rotating.

Said rotational plate 7b is inserted movably to axial direction of said drag spindle 9 at periphery of no. 1 extension part 9b of said drag spindle 9. At the center, a hole is formed that has same shape as the periphery of said no. 1 extension part 9b, for example, rectangular cross section so that rotational plate 7b can rotate together with said drag spindle 9 when said drag spindle 9 is made rotate.

Said wave spring 8 is inserted adjacent to said rotational plate 7b and at periphery of said drag spindle 9 movably to axial direction so as to provide a certain amount of elastic force resisting against the pressure when pressure is applied on said drag spindle 9.

Said drag spindle insert 12 is inserted rotationally at periphery of center shaft 6 so as to be rotated by rotating manipulation of said spool 3. As illustrated in FIGS. 3 to 5, the drag spindle insert 12 comprises a flange 12b having a pin groove 12a formed for inserting the protrusion pin 13a of spool 3, and an outer extension part 12c that is formed extendedly from said flange 12b to axial direction; a unidirectional bearing 10 to be described hereinafter is inserted at periphery of the outer extension part 12c.

In said unidirectional bearing 10 as illustrated in FIGS. 3 to 7: because a number of protrusion parts 10a that are formed at periphery are to be inserted into the key groove 9b that was formed extendedly to axial direction at inside of no. 2 extension part 9c of said drag spindle 9, moving of circumferential direction is restrained at inside of the drag spindle 9 but moving of axial direction only is permitted; and in the drag spindle insert 12 that is inserted at inside, one directional rotation is permitted but the other directional rotation is restrained due to the function of unidirectional bearing 10.

By the way, if direction setting of said unidirectional bearing 10 that is inserted at inside of drag spindle 9 is made different, then rotational permitted direction and limited direction in drag spindle insert 12 that is inserted at inside of unidirectional bearing 10 are made different too.

Whereas fly reel according to the present invention comprises as above description: at the state before drag works on drag spindle 9 as illustrated in FIG. 4, the drag knob 1 formed at one side of frame 2 has been completely unwound counterclockwise, and is located at left direction when seen to axial direction of center shaft 6. Under this state, push ball 5 with no external force being put thereon is located at left side too, and accordingly there is no any external force being applied on the friction means 7, that is, on fixed plate 7a, rotational plate 7b, and wave spring 8, and no external force is being applied on drag spindle 9, either. Then said drag spindle 9 is at such state where its rotations both clockwise and counterclockwise are free.

By the way, because drag spindle insert 12 was inserted at inside of unidirectional bearing 10, its one directional rotation is free but other directional rotation is restrained by the unidirectional bearing 10. Under this state: if a user rotates spool 3 to a direction where the rotating direction of drag spindle insert 12 connected to spool 3 accords with rotation-permitted direction of unidirectional bearing 10, the spool 3 can rotate freely with no resistance. If the user rotates spool 3 to a direction where the rotating direction of drag spindle insert 12 is not free, that is to say, to a direction where the direction of drag spindle insert 12 to rotate is opposite to the rotation-permitted direction of unidirectional bearing 10: although rotation-restraining force works on drag spindle insert 12 due to the function of unidirectional bearing 10, a rotational force by turning force of spool 3 which is bigger than said restraining force works on drag spindle insert 12. Such turning force of spool 3 exceeds rotation-restraining force of said unidirectional bearing 10 in affecting drag spindle 9, and drag spindle 9 is at a state of free rotation possible on center shaft 6. Therefore, drag spindle 9 in total is made rotate on center shaft 6.

Accordingly, at a state before drag works on drag spindle 9 as described as above, a user may turn the spool 3 to either direction to right or left as he wants to rotate the spool 3 freely to any wanted direction.

Under this state: when the user rotates drag knob 1 clockwise as illustrated in FIG. 5, drag knob 1 moves to right on center shaft 6, and enables push ball 5 to move to right, accordingly to compress friction means 7, that is, fixed plate 7a and rotational plate 7b; and compressed fixed plate 7a and rotational plate 7b then transfer force to wave spring 8 so that said wave springs 8 are compressed; the compression force of compressed wave springs 8 again is transferred to fixed plate 7a and rotational plate 7b; therefore, drag spindle 9 is restrained from rotating on center shaft 6.

By the way, under the state where drag spindle insert 12 that is inserted within unidirectional bearing 10 is free for one directional rotation: if the user turns spool 3 to a direction where said drag spindle insert 12 is free to rotate, drag spindle insert 12 that was connected to spool 3 is rotated freely, and accordingly spool 3 is rotated freely too. In case when spool 3 is turned to reverse direction, drag spindle insert 12 that was connected to spool 3 is restrained from rotating by unidirectional bearing 10, and drag spindle 9 that was connected to unidirectional bearing 10 is also restrained from rotating by friction means 7, therefore, the drag spindle insert 12 is made not free to rotate, and accordingly spool 3 also is limited from rotating.

Therefore, at the sate where drag has been working on drag spindle 9 as described as above, spool 3 is free to rotate to one direction, but restrained from rotation of reverse direction according to the degree of drag working thereon.

Figure 6:
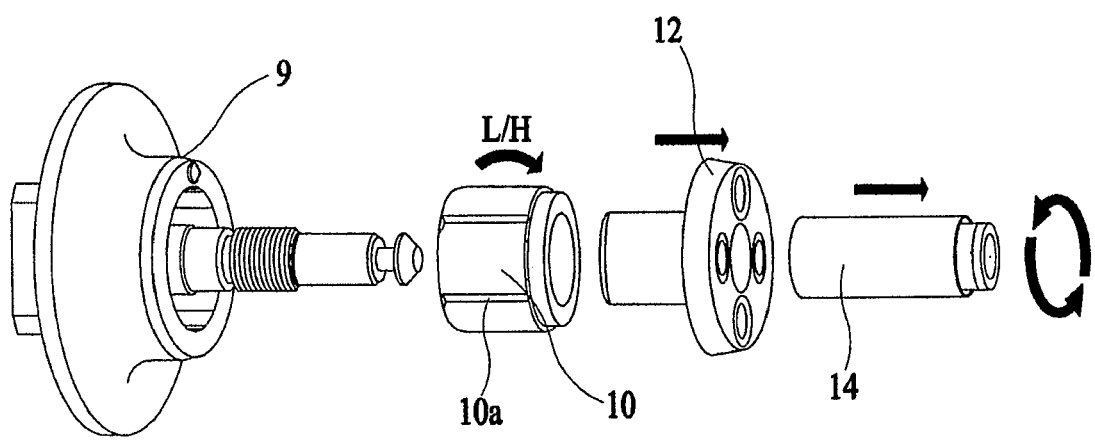
FIG. 6 is an explanatory drawing to describe conversion of drag direction in a fly reel according to present invention.

By the way, rotation-permitted direction of said drag spindle insert 12 that is inserted at inside of unidirectional bearing 10 is changed in accordance with the direction whereby the unidirectional bearing 10 is inserted into drag spindle 9. So, if the user is a left-handed person as illustrated in FIG. 6, left hand rotation of drag spindle insert 12 is always free; and as for right hand rotation, rotation is free when drag does not work, and rotation is limited or restrained when drag works. In case of right-handed user as illustrated in FIG. 7, right hand rotation of drag spindle insert 12 is always free; and as for left hand rotation, rotation is free when drag does not work, and rotation is limited or restrained when drag works.

Figure 7:
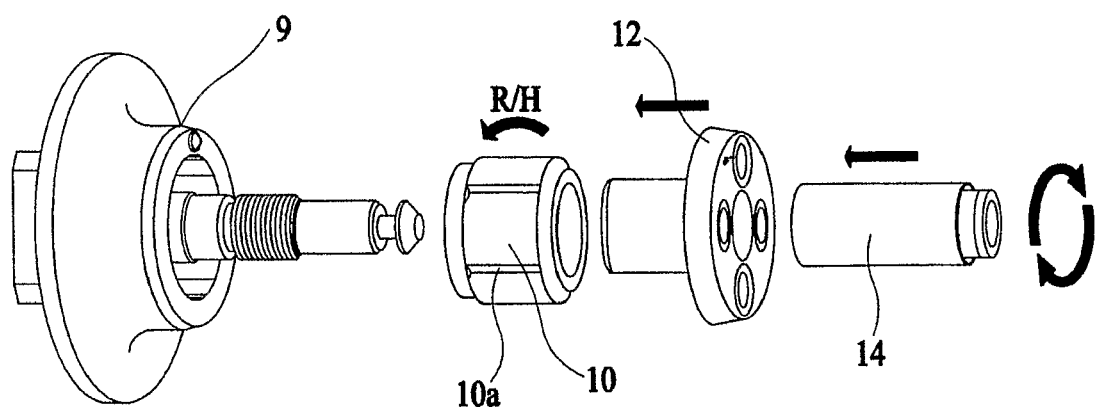
FIG. 7 is an explanatory drawing to describe conversion of drag direction in a fly reel according to present invention.

Therefore, in case when direction of drag has to be converted according to rotational direction of spool 3, at first referring to FIG. 1, attaching/detaching lever 3a of spool 3 is flipped; then said spool 3 is departed from frame 2 as illustrated in FIG. 2; referring again to FIG. 6, sleeve 14 that was inserted at periphery of center shaft 6 for preventing moving of axial direction of center shaft 6 is taken out; drag spindle insert 12 and unidirectional bearing 10 are separated from drag spindle 9; as illustrated in FIG. 7, unidirectional bearing 10 is turned over and inserted at inside of said drag spindle 9; then by assembling in reverse order, direction of drag according to rotational direction of spool 3 can easily be converted in accordance with the user's style of whether he is left-handed person or right-handed.

While the present invention has been described herein with reference to the preferred embodiments thereof illustrated as appended drawings, it will be apparent to those skilled in the art that various modifications, variations and equivalent embodiments or examples can be made therein without departing from the spirit and scope of the invention. Therefore, it is intended that the present invention covers the modifications, variations and equivalent embodiments or examples of this invention that come within the scope of the appended claims and their equivalents.

INDUSTRIAL APPLICABILITY

As has been described hereinbefore, according to the fly reel of the present invention, spool can be easily attached to or detached from frame and the configuration of drag system for controlling rotational speed of spool was made simple while the accuracy in drag adjustment was made so higher that overall productivity can be improved and production cost can be reduced. Furthermore, direction setting of unidirectional bearing that is built-in in drag system can be converted easily with no worry about possible loss of other parts or components.

What is claimed is:
1. A fly reel comprising:
a frame that is equipped with a hub at center,
a center shaft that is fixed-connected to said hub of frame,
a spool that is connected rotationally to said center shaft for winding or unwinding a fishing line, and
a drag system that is connected to said center shaft for controlling the rotational speed of said spool,
wherein said drag system comprises:
a drag knob that is connected rotationally to one side of a periphery of said center shaft;
a drag spindle that is connected rotationally to said periphery of said center shaft and distantly from said drag knob;
a friction means for restraining controllably any one-directional rotation force of said drag spindle in accordance with a rotation of said drag knob in the axial direction of said center shaft;
a drag spindle insert that is inserted to said periphery of said center shaft and rotated by rotational manipulation of said spool; and
a unidirectional bearing that is inserted at an inside of said drag spindle for permitting one directional rotation and restraining the other directional rotation of said drag spindle insert being inserted therein.

2. A fly reel according to claim 1, wherein said drag spindle insert is prevented from moving in the axial direction of said center shaft due to a sleeve that is inserted at said periphery of said center shaft.

3. A fly reel according to claim 1, wherein:

in said drag spindle, no. 1 extension part and no. 2 extension part are formed protrusively as respective axial directional extensions with a border of a flange formed at the center;

in said no. 1 extension part a bearing is inserted therein, and a rectangular part is formed at its periphery; and in said no. 2 extension part, one or more key grooves are formed extendedly in the axial direction.

4. A fly reel according to claim 1, wherein said drag spindle insert comprises:

a flange where a pin groove is formed for insertion of a protrusion pin of the spool; and an outer extension part that is formed extendedly in the axial direction from said flange for insertion of said unidirectional bearing.

5. A fly reel according to claim 1, wherein said friction means comprises:

a fixed plate that is inserted at a periphery of said drag spindle and movably in the axial direction of said drag spindle so as not to be rotated together with said drag spindle when said drag spindle rotates;

a rotational plate that is inserted at said periphery of said drag spindle and movably in the axial direction of said drag spindle so as to be rotated together with said drag spindle when said drag spindle rotates; and a wave spring that is inserted adjacent to said rotational plate and at said periphery of said drag spindle movably in the axial direction for providing a certain amount of elastic force against the pressure that is applied on said drag spindle.

* * * * *